US 008255217B2

(12) United States Patent
Stent et al.

(10) Patent No.: US 8,255,217 B2
(45) Date of Patent: Aug. 28, 2012

(54) SYSTEMS AND METHODS FOR CREATING AND USING GEO-CENTRIC LANGUAGE MODELS

(75) Inventors: Amanda Stent, Coram, NY (US); Diamantino Caseiro, Philadelphia, PA (US); Ilija Zeljkovic, Scotch Plains, NJ (US); Jay Wilpon, Warren, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 381 days.

(21) Appl. No.: 12/580,853

(22) Filed: Oct. 16, 2009

(65) Prior Publication Data

US 2011/0093265 A1 Apr. 21, 2011

(51) Int. Cl.
*G10L 15/06* (2006.01)
(52) U.S. Cl. .......................... 704/243; 704/231; 704/270
(58) Field of Classification Search .......... 704/231–245, 704/270–270.1
See application file for complete search history.

(56) References Cited

U.S. PATENT DOCUMENTS

| | | | | |
|---|---|---|---|---|
| 7,426,468 B2 * | 9/2008 | Coifman et al. | ............... | 704/275 |
| 7,437,295 B2 * | 10/2008 | Pitts et al. | ..................... | 704/275 |
| 7,630,900 B1 * | 12/2009 | Strom | ........................... | 704/275 |
| 8,060,367 B2 * | 11/2011 | Keaveney | ..................... | 704/247 |
| 2007/0038449 A1 * | 2/2007 | Coifman | ....................... | 704/243 |
| 2008/0154876 A1 * | 6/2008 | Hao | ................................. | 707/5 |
| 2009/0006077 A1 * | 1/2009 | Keaveney | ........................ | 704/9 |
| 2009/0015467 A1 * | 1/2009 | Kwon et al. | ............... | 342/357.1 |
| 2009/0119250 A1 * | 5/2009 | Reed | ................................. | 707/3 |
| 2009/0150156 A1 * | 6/2009 | Kennewick et al. | .......... | 704/257 |
| 2010/0191798 A1 * | 7/2010 | Seefeld et al. | ................ | 709/203 |
| 2011/0022292 A1 * | 1/2011 | Shen et al. | .................... | 701/200 |

OTHER PUBLICATIONS

Stent, Amanda et al. "Geo-Centric Language Models for Local Business Voice Search" Human Language Tech: 2009 Annual Conf of the NA Chapter of the ACL, pp. 389-396 (Jun. 2009).

* cited by examiner

*Primary Examiner* — Douglas Godbold
(74) *Attorney, Agent, or Firm* — Parks IP Law LLC; Mickki D. Murray, Esq.

(57) ABSTRACT

Systems and methods for creating and using geo-centric language models are provided herein. An exemplary method includes assigning each of a plurality of listings to a local service area, determining a geographic center for the local service area, computing a listing density for the local service area, and selecting a desired number of listings for a geo-centric listing set. The geo-centric listing set includes a subset of the plurality of listings. The exemplary method further includes dividing the local service area into regions based upon the listing density and the number of listings in the geo-centric listing set, and building a language model for the geo-centric listing set.

20 Claims, 8 Drawing Sheets

SYSTEMS AND METHODS FOR CREATING AND USING GEO-CENTRIC LANGUAGE MODELS

TECHNICAL FIELD

The present disclosure relates generally to voice recognition and, more particularly, to systems and methods for creating and using geo-centric language models for use by voice recognition systems.

BACKGROUND

Voice-driven local business search (VDLBS) is an increasingly popular application of speech recognition to mobile telephony services. With VDLBS, a user provides a desired location (e.g., city/state) and a business name. The most common traditional voice-driven search is a 411-style automated directory assistance, implemented as a speech-only, two-exchange dialog between the user and an automatic speech recognition (ASR) system. An exemplary 411-style voice-driven search dialog is conducted as follows: the ASR system first prompts a user to speak a location as a city and state; next, the user provides the requested city and state information; the ASR system then prompts the user for a listing input; the user provides the requested listing information; and finally, the system provides one or more matching listings.

In traditional voice-driven search, such as in the foregoing example, the ASR system uses one grammar, or language model, to recognize the city and state information, and subsequently uses separate location-specific grammars to recognize listings in each state. This type of voice-driven search provides relatively good recognition accuracy.

Advancements in ASR systems and search technologies have made one-exchange voice-driven search feasible. In this approach, the ASR system typically uses a large stochastic language model that gives the user the freedom to specify a location and a listing name and/or listing category together in a single utterance, and then submits the speech recognition results to a term frequency-inverse document frequency (TF-IDF) based search engine. This gives the user more flexibility to provide all searchable information at one time.

In evaluations of this approach, it has been found that, in one-exchange VDLBS, listing names are recognized at a much lower accuracy (e.g., in some instances below 55%) than locations (e.g., in some instances above 90%). When a location or listing name is not recognized by a one-exchange VDLBS, the user has to repeat both the location and the listing name, and perhaps several times. On the other hand, when a location or listing name is not recognized by a two-exchange interaction, only one piece of information has to be repeated. In effect, the advancements allowing one-exchange searching provide more dialog flexibility at the expense of recognition accuracy.

Due to reduced recognition accuracy and the resulting need for repeated utterances of both location and listing name information, users may become frustrated and be less willing to adopt or become repeat users of the one-exchange VDLBS applications. In contrast, a two-exchange interaction requires separate utterances up front, but only requires one piece of information to be repeated in the event of a misrecognition. This presents a problem for system developers, in that they must trade recognition accuracy for interaction flexibility, or vice versa.

SUMMARY

Systems and methods of the present disclosure improve the accuracy and speed of speech recognition and search, while not limiting a user's freedom to request the desired location and listing name in a single utterance. The systems and methods of the present disclosure improve accuracy and speed of speech recognition by using a user's location, determined via cellular triangulation techniques, WIFI triangulation techniques, Global Positioning System (GPS), area codes, user input, combinations thereof, and the like. Particularly, for example, the systems and methods of the present disclosure use a geo-centric language model based, in part, upon the location of the mobile device to achieve improved speech recognition accuracy and speed. This novel approach unobtrusively exploits the benefits of two-exchange VDLBS applications, while maintaining the flexibility of one-exchange VDLBS applications.

In various embodiments, the present disclosure provides systems and methods for constructing geo-centric language models from a listing database and logs. The systems and methods described herein provide several advantages over previous voice-driven search systems. One advantage is that the systems and methods provide a language model for any user at any location without limiting served locations to major metropolitan areas or areas with relatively high listing density, for example. Another advantage is improved recognition accuracy, resulting at least in part from using a geo-centric language model adapted to a local listing density in a geographic area. Yet another advantage is improved recognition time, resulting at least in part from pre-compilation of the geo-centric language models.

In experiments using voice-driven search queries, the inventors achieved a marked improvement in recognition accuracy and speedup of recognition time using the disclosed geo-centric language models, compared with, for example, an existing nationwide language model, such as those used in one-exchange VDLBS. Further experiments also revealed increases in recognition accuracy and faster recognition times using the disclosed geo-centric language models, compared with traditional local area language models, such as those used in two-exchange VDLBS.

DETAILED DESCRIPTION

Figure 1:
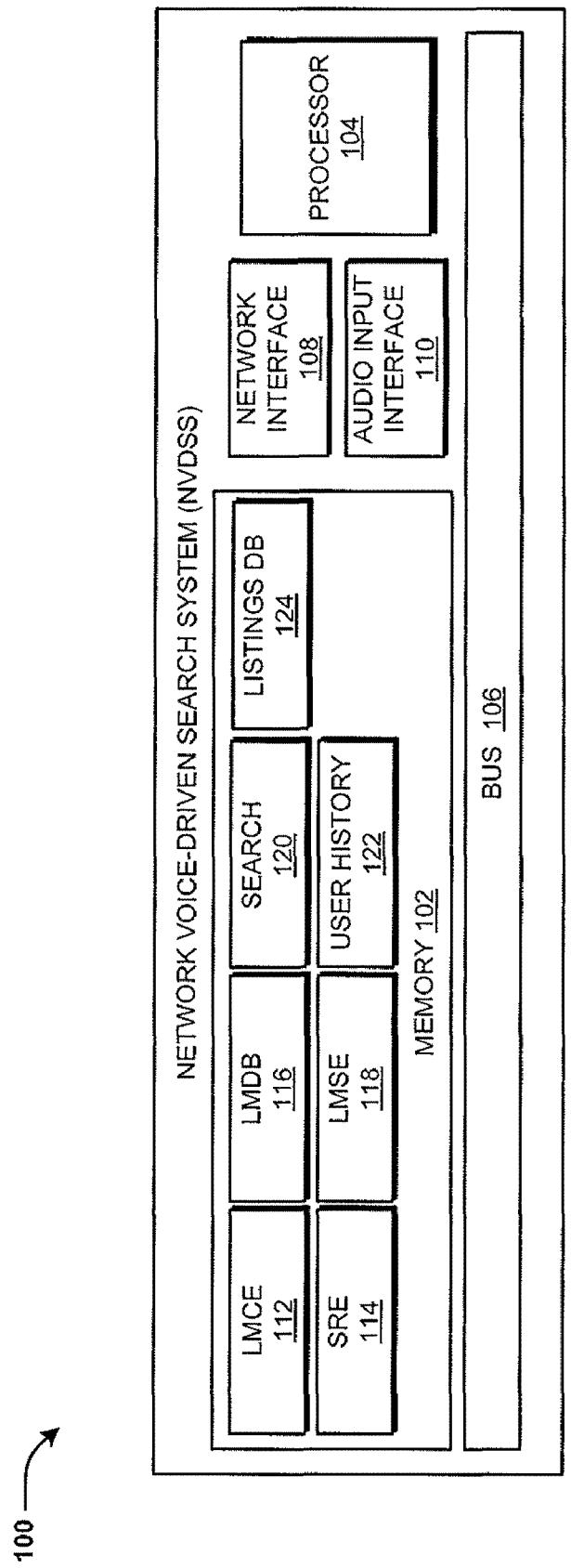
FIG. 1 illustrates an exemplary network-based voice-driven search system (NVDSS) and components thereof, according to one embodiment of the present disclosure.

As required, detailed embodiments of the present disclosure are disclosed herein. The disclosed embodiments are merely examples that may be embodied in various and alternative forms, and combinations thereof. As used herein, for example, "exemplary," and similar, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Users of directory assistance services, such as voice-driven search, are often looking for local businesses. The systems and methods of the present disclosure provide a way to build a language model for the local listings for any location where a user could be located. To build a geo-centric language model for a user, the geo-coordinates for the center of the language model and the search radius (to determine the area covered by the language model) must be determined.

Theoretically, the number of geo-coordinates from which geo-centric language models could be centered is equal to the number of separate determinable geo-coordinate locations that can be resolved by the accuracy of GPS technology. With respect to GPS, for example, because location resolution can be as high as 20 or 30 feet, language models could be developed for locations as close as 30 feet apart in certain instances. This would result in an impractically large number of language models.

Instead of building a local language model for each possible set of geo-coordinates, the present disclosure provides methods to build one language model for each business listing. In other words, because most geo-coordinates at which a user may be located are "dead space" (i.e., not related to a business listing), the systems and methods described herein substitute the geo-coordinates of the business closest to the user for the user's actual geo-coordinates.

To determine the search radius mentioned above, the systems and methods of the present disclosure determine a locality, or local area of a user and/or listings local to them. The size of local areas varies depending upon location. For example, in New York City, a local listing may be up to ten blocks away from a user (e.g., covering a smaller geographic area than a typical local service area), while in Vaughn, Mont. a local listing may be fifty miles away (e.g., covering a larger geographic area than a local service area). Generally, local areas are defined based upon density of listings. As such, the systems and methods of the present disclosure compute listing density to determine a radii for geo-centric language models.

Since businesses are often clustered geographically (e.g., in towns, shopping malls, etc.), a set of listings local to one business is likely to be very similar to the set of listings local to a nearby business. Accordingly, efficiencies are achieved by not building a separate language model for each business listing. Instead, in some embodiments, the systems and methods of the present disclosure are configured to determine which listings should be included in which language models. As described below in further detail, the systems and methods of the present disclosure then quantize the listings so that those having the same or mostly the other listings nearby share a single language model. This process is summarized below with respect to FIG. 5.

While the present disclosure is often described as providing voice-driven local business search (VDLBS) functionality, alternative embodiments provide voice-driven local search for entities other than businesses. For example, voice-driven local searching, according to the systems and methods described herein, could be used to identify sports scores, movie times, news stories, weather reports, people, points of interest, parks, recreation facilities, amusement parks, lakes, beaches, natural parks, reserves, places of worship, non-profit organizations, schools, colleges, universities, research facilities, neighborhoods, residential addresses, cities, counties, and other municipalities, or governments, general directory information, and other establishments, locations or events that may or may not be legally represented as a business, per se.

As used herein, unless otherwise noted, the term listing refers to any entry in a database that has a location associated with it. The term search refers to an activity that is designed to return one or more of these listings, whether as a service on its own or as part of a larger system or service. The term voice-driven refers to a system or service that permits voice input as a primary modality, even if such a system also permits input via text, gesture, or other modalities. The term listing density refers to a number of listings in a specified geographic area. The term local service area refers to a service area as defined by a telecommunications service provider, a wireless telephone service provider, a wireline telephone service provider, or an Internet service provider. The term geographic center refers to the center, in latitude and longitude, of a given geographic area.

The systems and methods provided herein are often described in context of a voice-driven local business search application. In some embodiments, however, the systems and methods are used to create geo-centric language models for use with other applications, such as other location based services.

The systems, device and methods described herein are described with reference to wireless network elements of a Global System for Mobile communications (GSM) network and a Universal Mobile Telecommunications System (UMTS) network. Novel network elements for remotely processing speech input for a voice-driven search application are also described. The present disclosure is not limited to GSM and UMTS networks. Rather, the present disclosure is applicable to any existing or yet to be developed telecommunications technology. Some examples of other suitable telecommunications technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), and various other 2G, 2.5G, 3G (third generation), and above (4G and beyond) technologies. Examples of suitable data enabling bearers include General Packet Radio Service (GPRS), Enhanced Data rates for Global Evolution (EDGE), the High-Speed Packet Access (HSPA) protocol family, such as, High-Speed Downlink Packet Access (HSPDA), Enhanced Uplink (EUL) or otherwise termed High-Speed Uplink Packet Access (HSUPA), Evolved HSPA (HSPA+), and various other current and future data enabling bearers.

Referring now to FIG. 1, a network-based voice-driven search system (NVDSS) 100 and components thereof are illustrated, according to one embodiment of the present disclosure. Although connections are not shown between the components illustrated in FIG. 1, the components can interact with each other to carry out system functions. It should be understood that FIG. 1 and the following description are intended to provide a brief, general description of a suitable environment in which the various aspects of some embodiments of the present disclosure can be implemented. In particular, the illustrated environment is for an embodiment of the present disclosure wherein a mobile device communicates with a network system, for example, via a wireless communications network to conduct a voice-driven search for a business or other listing near a present location of the mobile device.

While the description includes a general context of computer-executable instructions, the present disclosure can also be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, handheld computing devices, microprocessor-based, programmable consumer electronics, combinations thereof, and the like.

In the illustrated embodiment, the NVDSS 100 is a combination of hardware and software. In some embodiments, the NVDSS 100 is operated by a wireless service provider or a third party, such as a directory assistance provider, for example. The illustrated NVDSS 100 includes one or more memory modules 102 that are operatively linked and in communication with one or more processors 104 via one or more data/memory busses 106. The illustrated NVDSS 100 also includes a network interface 108 and an audio input interface 110, each of which are operatively linked and in communication with the processor 104 and the memory module 102 via the data/memory bus 106.

The word "memory," as used herein to describe the memory 102, collectively includes all memory types associated with the NVDSS 100. Examples of memory types include, but are not limited to, processor registers, processor cache, random access memory (RAM), other volatile memory forms, and non-volatile, semi-permanent or permanent memory types. In particular, examples of non-volatile memory types include, but are not limited to, tape-based media, optical disc media, solid state media, hard disks, storage arrays, database structures, combinations thereof, and the like. While the memory 102 is illustrated as residing proximate the processor 104, it should be understood that the memory 102 can be a remotely accessed storage system, such as, a local server, an Internet server, a remote hard disk drive, a removable storage medium, a network storage device, combinations thereof, and the like. Moreover, the memory 102 is intended to encompass network memory and/or other storage devices in wired or wireless communication with the NVDSS 100, which may utilize the network interface 108 to facilitate such communication. Thus, any of the data, applications, and/or software described below can be stored within the memory 102 as illustrated and/or accessed via network connections to other data processing systems (not shown). The networked data processing systems may include a local area network (LAN), a metropolitan area network (MAN), or a wide area network (WAN) networked systems, for example. Accordingly, in some embodiments of the present disclosure, the NVDSS 100 is configured as a server to one or more client data processing systems, such as a mobile device or the like, as dictated by a client/server model, for example.

The illustrated memory 102 includes applications and databases such as, a language model (LM) creation engine (LMCE) 112, a speech recognition engine (SRE) 114, an language model database (LMDB) 116, an language model selection engine (LMSE) 118, a search engine 120, a user history database 122, and a listings database 124, for example. It is contemplated that the NVDSS 100 can be configured to store the above applications to perform some or all steps of the methods described herein by executing one or more of the applications. Generally, the applications can include, for example, programs, routines, subroutines, algorithms, software, and the like.

It should be understood that any of the aforementioned applications may exist on separate systems that are established to perform various tasks outside of a voice-driven search context. In some embodiments, for example, the LM creation engine (LMCE) is a system configured to perform the methods for creating geo-centric language models described herein (see, e.g., FIGS. 5-7). In these embodiments, the LMCE includes hardware and/or software that is sufficient to perform the methods described above. For example, the LMCE may include one or more processors, memory modules, input/output interfaces, busses, and the like similar to those described with reference to the NVDSS 100. The SRE 114 and the LMSE 118 may be likewise configured.

In addition, applications of the NVDSS 100 shown or described separately herein can be combined into one or more applications. For example, although the applications 112, 114, 118, 130 are illustrated as separate applications, it should be understood that these applications or the functionality thereof can be combined into a single application, for example, a voice-driven search application (not shown).

In some embodiments, the LMCE 112 is configured to create a language model in accordance with the methods described below with reference to FIGS. 5-7. In some embodiments, the SRE 114 is configured to utilize acoustic and language models to process speech input received by way of, for example, the audio input interface 108. In these embodiments, the audio input interface 108 can function as a telephone user interface to receive the speech input. In alternative embodiments, speech input is received by way, for example, the network interface 108 as an audio file in any audio format chosen with consideration given to file size and audio quality. An exemplary SRE is described below with reference to FIGS. 3 and 4. In some embodiments, the LMDB 116 is configured to store language models created by the LMCE 112, for example. An exemplary LMCE is described below with reference to FIG. 4.

In some embodiments, the LMSE 118 is configured to select one or more language models based upon a location of a mobile device received by way of, for example, the network interface 108. Language models selected by the LMSE 118 are retrieved from the LMDB 116 or generated in real-time or near real-time using, for example, pre-compiled language model data.

In some embodiments, the search engine 120 is configured to search the listing database 124 to determine one or more listings that match the words output by the SRE 114. In certain cases the SRE 114 may not be able to determine a word match for a given speech input so, in these cases, the SRE 114 can identify the closest word match. The user history database 122 can be configured to store search query history information for one or more users of a network-based voice-driven search function.

Figure 2:
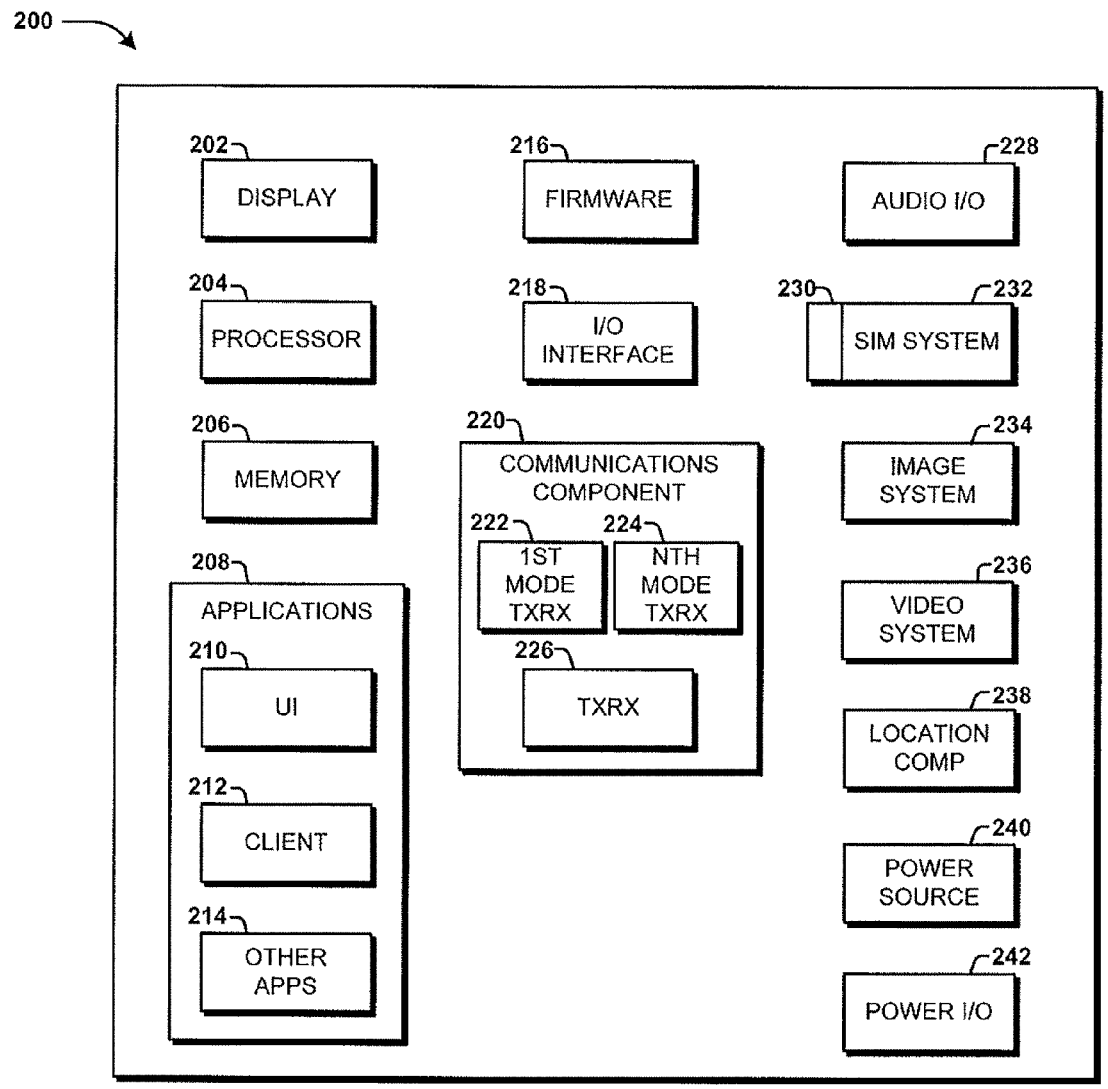
FIG. 2 illustrates an exemplary mobile device and components thereof, according to one embodiment of the present disclosure.

FIG. 2 illustrates a schematic block diagram of an exemplary mobile device 200 for use in accordance with some exemplary embodiments of the present disclosure. Although connections are not shown between the components illustrated in FIG. 2, the components can interact with each other to carry out device functions. For example, the components can be arranged so as to communicate via one or more busses (not shown).

It should be understood that FIG. 2 and the following description are intended to provide a general understanding of a suitable environment in which the various aspects of some embodiments of the present disclosure can be implemented. In particular, the illustrated environment is for an embodiment of the present disclosure wherein a mobile device includes a voice-driven search application for use in finding a business or other listing near the location of the mobile device.

While the description includes a general context of computer-executable instructions, the present disclosure can also be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, handheld computing devices, microprocessor-based, programmable consumer electronics, combinations thereof, and the like.

The mobile device 200 can be a multimode headset, and can include a variety of computer readable media, including volatile media, non-volatile media, removable media, and non-removable media. The term "computer-readable media" and variants thereof, as used in the specification and claims, can include storage media and communication media. Storage media can include volatile and/or non-volatile, removable and/or non-removable media. For example, RAM, ROM, EEPROM, solid state memory or other memory technology, CD ROM, DVD, or other optical disk storage, magnetic tape, magnetic disk storage or other magnetic storage devices, or any other medium that can be used to store the desired information and that can be accessed by the mobile device 200.

As illustrated in FIG. 2, the mobile device 200 includes a display 202 for displaying multimedia such as, for example, text, images, video, telephony functions such as Caller ID data, setup functions, menus, music, metadata, messages, wallpaper, graphics, Internet content, device status, preferences settings, map and location data, business listings, general directory listing information, residential addresses, and the like. The illustrated mobile device 200 also includes a processor 204 for controlling, processing data (e.g., a speech signal), and/or executing computer-executable instructions of an application, and a memory 206 for storing data and/or one or more applications 208.

In some embodiments, the application(s) 208 include, for example, a speech recognition engine, a language model creation engine, a search engine, a language model selection engine, map software, directory assistance software, messaging software, combination thereof, such as provided in a voice-driven search application, and the like. In some embodiments, the application(s) 208 include a user interface (UI) application 210. The UI application 210 interfaces with a client 212 (e.g., an operating system) to facilitate user interaction with device functionality and data. For example, the UI application and aid the user in providing speech input, entering message content, viewing received messages, answering/initiating calls, entering/deleting data, entering and setting passwords, configuring settings, manipulating address book content and/or settings, and the like. In some embodiments, the applications 208 include other applications 214 such as, for example, add-ons, plug-ins, email applications, music applications, video applications, camera applications, location-based service (LBS) applications, power conservation applications, game applications, productivity applications, entertainment applications, combinations thereof, and the like. The applications 208 are stored in the memory 206 and/or in a firmware 216, and can be executed by the processor 204. The firmware 216 can also store code for execution during device 200 power up, for example.

The illustrated mobile device 200 also includes an input/output (I/O) interface 218 for input/output of data and/or signals. The I/O interface 218 can be a hardwire connection, such as, for example, a USB, mini-USB, audio jack, PS2, IEEE 1394, serial, parallel, Ethernet (RJ48), RJ11, and the like can accept other I/O devices such as, for example, keyboards, keypads, mice, interface tethers, stylus pens, printers, thumb drives, touch screens, multi-touch screens, touch pads, trackballs, joysticks, microphones, remote control devices, monitors, displays, liquid crystal displays (LCDs), combinations thereof, and the like. It should be appreciated that the I/O interface 218 can be used for communications between the device and a network or local device, instead of, or in addition to, a communications component 220.

The communications component 220 interfaces with the processor 204 to facilitate wired/wireless communications with external systems. Example external systems include, but are not limited to, the NVDSS 100, network databases, network storage systems, map databases, listing databases, cellular networks, location systems, VoIP networks, LANs, WANs, MANs, PANs, and other networks, which can be implemented using WIFI, WIMAX, combinations and/or improvements thereof, and the like. The communications component 220 can also include a multimode communications subsystem for providing cellular communications via different cellular technologies. For example, a first cellular transceiver 222 can operate in one mode, such as, GSM, and an Nth transceiver 224 can operate in a different mode, such as UMTS. While only two transceivers 222, 224 are illustrated, it should be appreciated that a plurality of transceivers can be included.

The illustrated communications component 220 includes a transceiver 226 for other communications technologies such as, for example, WIFI, WIMAX, BLUETOOTH, infrared, IRDA, NFC, RF, and the like. The communications component 220 can also facilitate reception from terrestrial radio networks, digital satellite radio networks, Internet-based radio services networks, combinations thereof, and the like. The communications component 220 can process data from a network such as, for example, the Internet, a corporate intranet, a home broadband network, a WIFI hotspot, and the like, via an ISP, DSL provider, or broadband provider. In some embodiments, the communications component 220 facilitates the transmission of speech input received locally at the mobile device 200 from a user to the NVDSS 100 for processing in accordance with the methods described herein.

Audio capabilities for the mobile device 200 can be provided by an audio I/O component 228 that includes a speaker for the output of audio signals and a microphone to collect audio signals, such as speech signals provided by a user for a voice-driven search application.

The illustrated mobile device 200 also includes a slot interface 230 for accommodating a subscriber identity system 232 such as, for example, a subscriber identity module (SIM) card or universal SIM (USIM) card. Alternatively, the subscriber identity system 232 can be manufactured into the device 200, thereby obviating the need for a slot interface 230. In some embodiments, the subscriber identity system 232 stores certain features, user characteristics, rules, policies, models, contact information, and the like. In some embodiments, the subscriber identity system 232 is programmed by a manufacturer, a retailer, a user, a computer, a network operator, and the like.

The illustrated mobile device 200 also includes an image capture and processing system 234 (image system). Photos and/or videos can be obtained via an associated image capture subsystem of the image system 234, for example, a camera. The illustrated mobile device 200 also includes a video system 236 for capturing, processing, recording, modifying, and/or transmitting video content.

The illustrated mobile device also includes a location component 238 for sending and/or receiving signals such as, for example, GPS data, assisted GPS (A-GPS) data, WIFI/WIMAX and/or cellular network triangulation data, combinations thereof, and the like, for determining a location of the mobile device 200. The location component 238 can interface with cellular network nodes, telephone lines, satellites, location transmitters and/or beacons, wireless network transmitters and receivers, for example, WIFI hotspots, radio transmitters, combinations thereof, and the like.

Using the location component 238, the mobile device 200 can obtain, generate, and/or receive data to identify its location, or can transmit data used by other devices to determine the mobile device 200 location. The location of the mobile device 200 can be used by a voice-driven search application (not shown in detail) stored in the memory 206 to select a language model that is appropriate for any given location, Alternatively, the location of the mobile device 200 can be sent to the NVDSS 100 via the communications component 220 for remote processing if the mobile device 200 is not equipped with a voice-driven search application or at the user's discretion or preference.

The illustrated mobile device 200 also includes a power source 240, such as batteries and/or other power subsystem (AC or DC). The power source 242 can interface with an external power system or charging equipment via a power I/O component 242.

Figure 3:
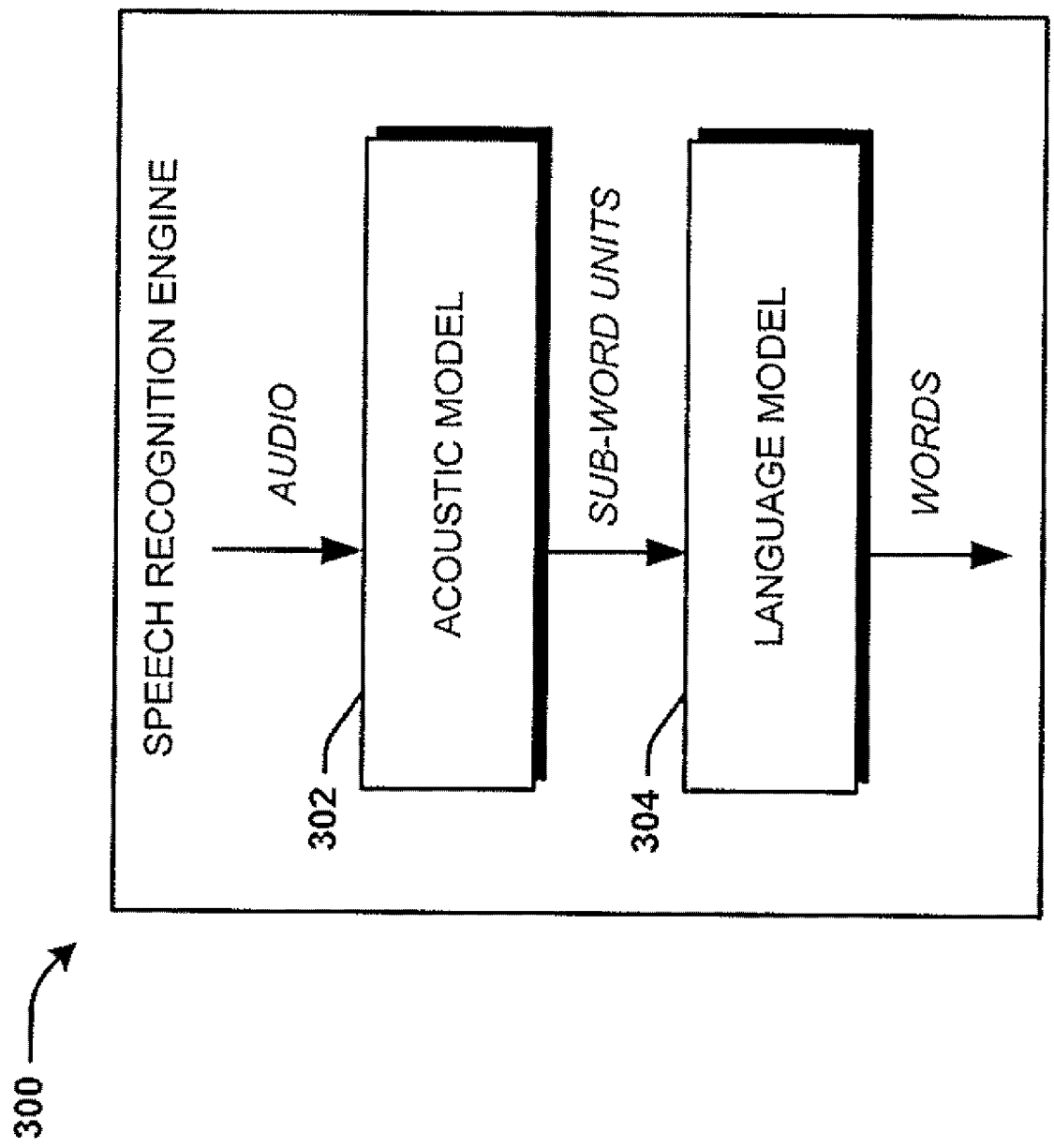
FIG. 3 illustrates an exemplary speech recognition engine, according to one embodiment of the present disclosure.

Referring now to FIG. 3, an exemplary speech recognition engine (SRE) 300 is illustrated. In some embodiments, the SRE 300 is the NVDSS SRE 114 and includes instructions executable by the NVDSS 100. In other embodiments, the SRE 300 is one of the applications 208 stored in the mobile device 200 and includes instructions executable by the mobile device 200.

The illustrated SRE 300 uses two statistical models to process speech. The first statistical model is an acoustic model 302. The SRE 300 receives audio in the form of a speech signal via the audio input interface 108 or the audio I/O 228, for example. The SRE 300 processes the speech signal according to the acoustic model 302, which generates an output as a sequence of sub-word units. The sub-word unit sequence is provided as the input to the second statistical model, the language model 304.

The SRE 300 processes the sub-word unit sequence according to the language model 304 to determine one or more words that best match the sub-word unit sequence. The SRE 300 provides the words as an output. The more words included in the language model 304, and the more ways in which the distinct words can be combined, the more difficult it is for the language model 304 to accurately and efficiently find the sequence of words that best match the input sub-word unit sequence.

The SRE 300 can be implemented as hardware (e.g., dedicated system components or integrated circuit), software, firmware, or combinations thereof. In one embodiment, the SRE 300 is embodied as a dedicated speech recognition system that includes one or more processors and one or more memory components sufficient to analyze and process the audio input signal in accordance with the acoustic and language models 302, 304 to determine a sequence of words that best match the audio input signal. In another embodiment, the SRE 300 is provided as an application stored in a memory or storage component of a processing system, such as the NVDSS 100 or the mobile device 200 as described above, for example.

One aspect of the present disclosure is to more precisely define a language model by incorporating the location information of a user (customer). The SRE 300 formulates the language model using the location as determined by the user's mobile device, for example, considering that the user most likely seeks information about a business that is proximate to their present location. The NVDSS 100 and/or mobile device 200 can be configured to allow the user to indicate that they seek information about a non-local business. For example, the NVDSS 100 and/or the mobile device 200 can be configured to receive a location selection input via one or more of an entry of a location via a keypad, touchscreen, microphone (voice input), or the like. Accordingly, the systems and methods of the present disclosure can define and build a language model that contains only listings that are near the user.

Figure 4:
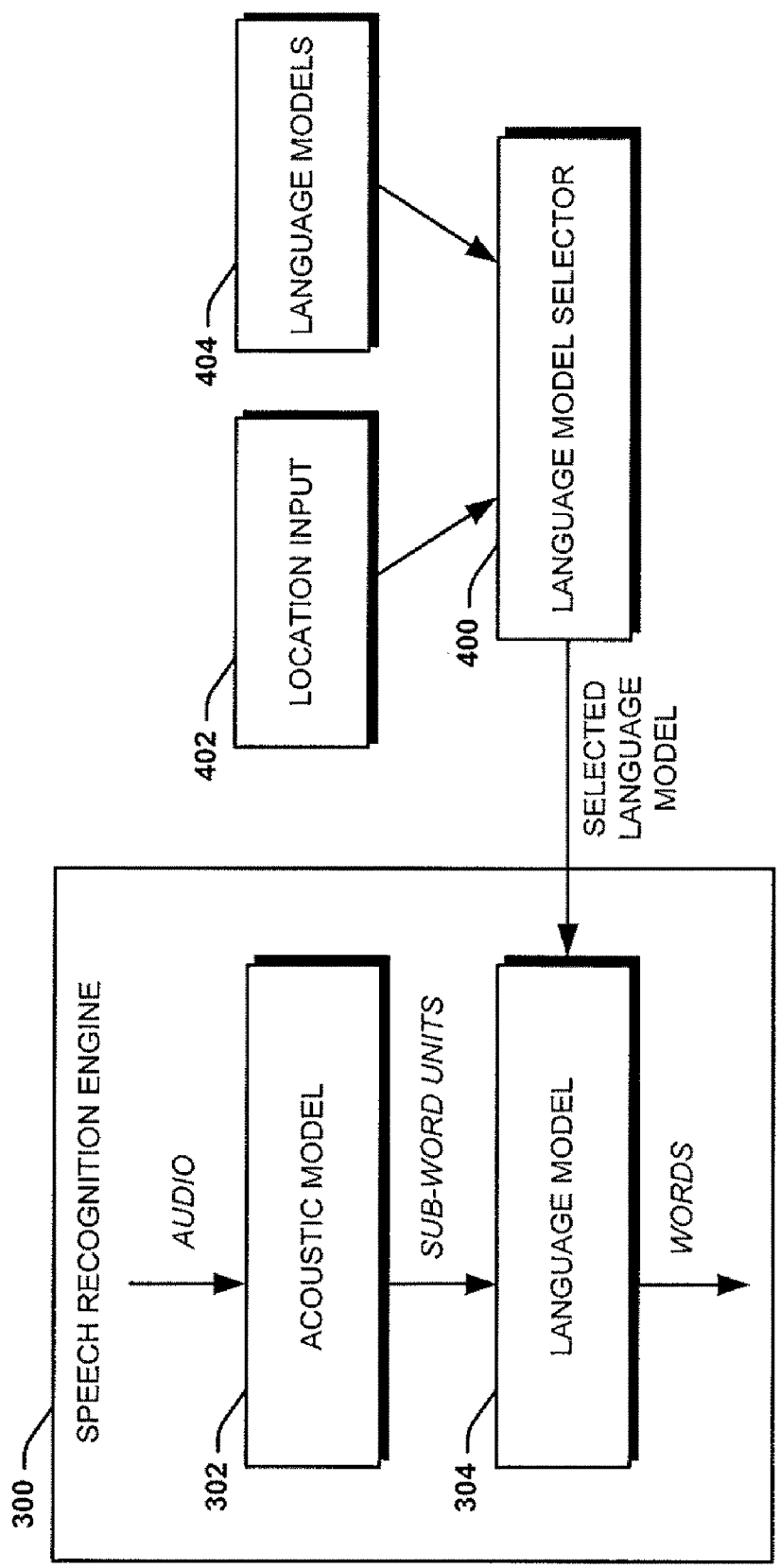
FIG. 4 illustrates an exemplary speech recognition engine configured to use geo-centric language models for voice-driven search, according to one embodiment the present disclosure.

Referring now to FIG. 4, an exemplary SRE 300 configured to use geo-centric language models for voice-driven search is illustrated, according to one embodiment the present disclosure. In the illustrated embodiment, a language model selector 400 is configured to provide a selected language model to the SRE 300 based upon, for example, a location input 402. The location input 402 can be provided by a user's mobile device, such as the device 200, and determined via cellular triangulation techniques, WIFI triangulation techniques, GPS, A-GPS, any combination thereof, and the like. The language model selector 400 uses the location input 402 to select a language model from a set of language models 404 stored in, for example, a language model database, such as the language model database 116 of the NVBDSS 100 or a language model database (not shown) stored in the memory 206 of the device 200. In some embodiments, a user's search history is retrieved from the user history database 122 and used, at least in part, to aid in selecting a language model.

In some embodiments, the language model selector 400 is implemented as hardware software, firmware, or combinations thereof. In one embodiment, the language model selector 400 is provided as a dedicated language model selection system that is capable of communication with the SRE 300, operating as a dedicated speech recognition system, to provide a selected language model 304 for use by the SRE 300 in analyzing and processing a speech signal.

In another embodiment, the language model selector 400 is provided as an application stored in a memory or storage component of a processing system, such as illustrated in FIG. 1 by the LMSE 118 of the NVDSS 100, or an application 208 of the mobile device 200 shown in FIG. 2. The SRE 300 and the language model selector 400 can be co-located in a memory or storage component of a processing system as distinct applications capable of communicating with one another to perform various aspects of the methods described herein. In one embodiment, the SRE 300 and the language model selector 400, or the functionality thereof, are combined as part of a voice-driven search application that can be executed by the NVDSS 100 or the mobile device 200.

Figure 5:
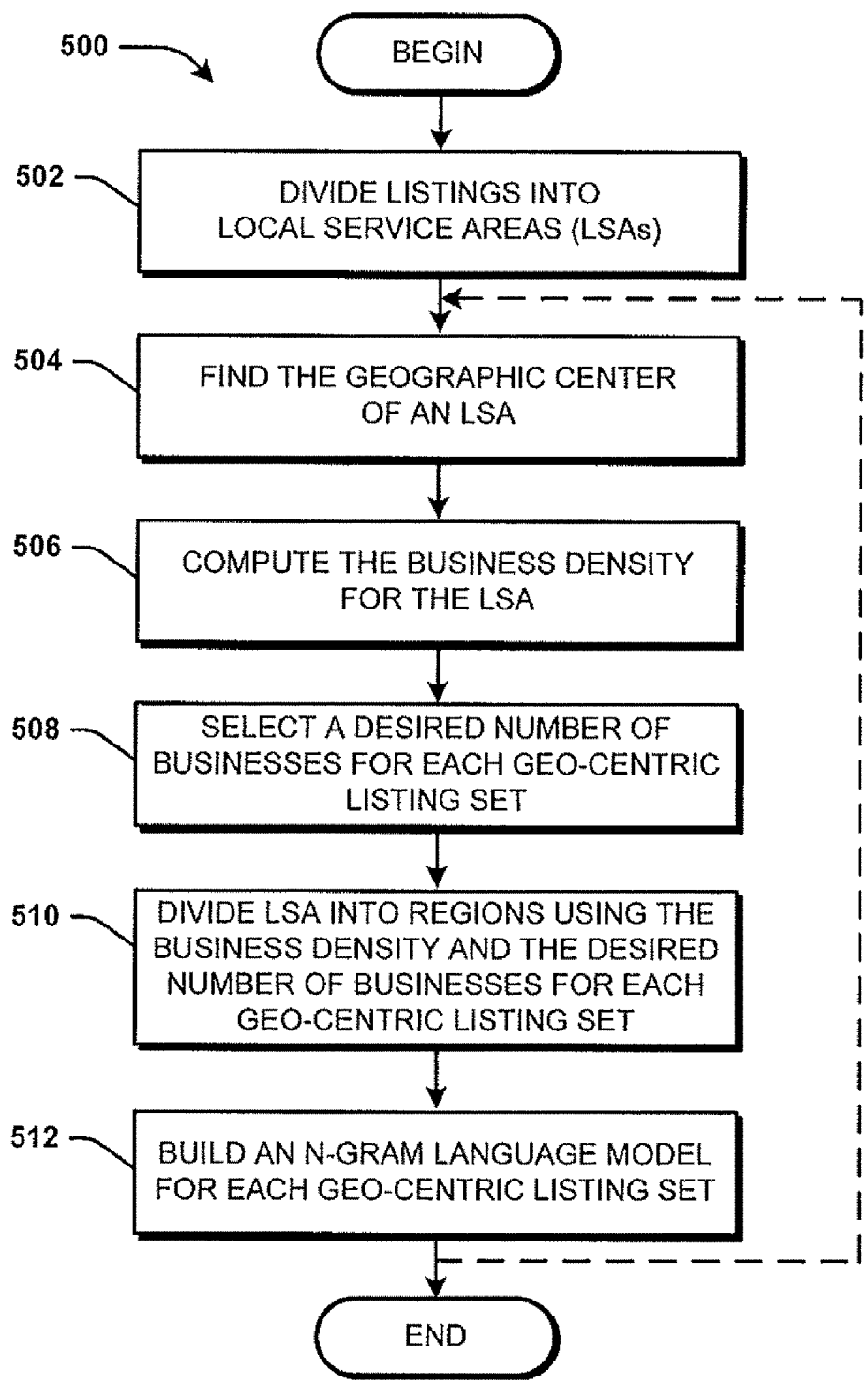
FIG. 5 illustrates an exemplary method for creating geo-centric language model, according to one embodiment of the present disclosure.

Referring now to FIG. 5, an exemplary method 500 for creating geo-centric language models is illustrated, according to one embodiment of the present disclosure. It should be understood that the steps of the method 500 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 500 can be ended at any time. Some or all steps of this process, and/or substantially equivalent steps can be performed by execution of computer-readable instructions stored or included on a computer readable medium, such as the memory module 102 of the NVDSS 100 or the memory 206 of the mobile device 200, for example.

The method 500 begins and flow proceeds to block 502, wherein a given set of listings is divided into local service areas (LSAs). It is contemplated that the LSAs may be defined by a service provider, such as a wireless service provider or directory assistance service provider, for example. It is further contemplated that the LSAs may be automatically derived, for example, via an algorithm that segments a country by population density. At block 504, a geographic center is determined for a given LSA. At block 506, a business density for the LSA is computed. At block 508, a desired number of businesses are selected for each geo-centric listing sets. At block 510, the LSA is divided into regions using the business density and the desired number of businesses for each geo-centric listing set. At block 512, an n-gram language model is built for each geo-centric listing set. The method 500 can end. Optionally, flow can return to block 504 via the illustrated return loop for each remaining LSA. The steps of the method 500 are described in further detail with respect to FIGS. 5 and 6.

Figure 6:
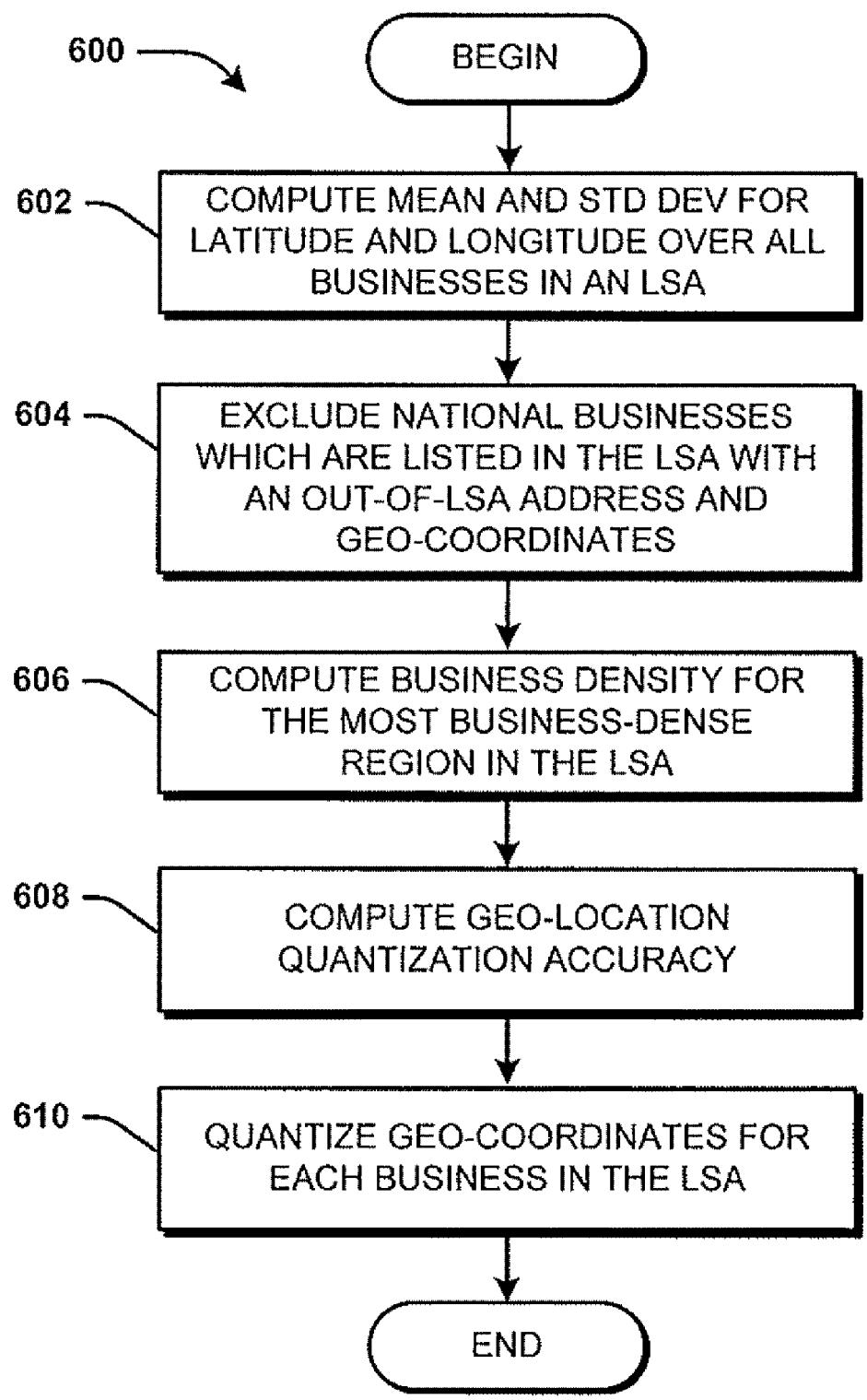
FIG. 6 illustrates an exemplary method for computing geo-coordinates and radii for geo-centric language models, according to one embodiment of the present disclosure.

Referring now to FIG. 6, a method 600 for computing the geo-coordinates and radii for geo-centric language models is illustrated, according to one embodiment of the present disclosure. It should be understood that the steps of the method 600 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 800 can be ended at any time. In certain embodiments, some or all steps of this process, and/or substantially equivalent steps can be performed by execution of computer-readable instructions stored or included on a computer readable medium, such as the memory module 102 of the NVDSS 100 or the memory 206 of the mobile device 200, for example. In other embodiments, some or all steps of this process and/or substantially equivalent steps can be performed by the LMCE 112, the SRE 114, the LMSE 118 of the NVDSS 100 or functionally equivalent engines (not shown) of the mobile device 200 depending upon whether the method 700 is being implemented at the network- or device-level.

The method 600 begins and flow proceeds to block 602, wherein a mean ($\mu_{lb}$) and a standard deviation ($\sigma_{lb}$) are computed for the latitude coordinate, and a mean ($\mu_{gb}$) and a standard deviation ($\sigma_{gb}$) are computed for the longitude coordinate. The means and standard deviations for the latitude and longitude coordinate are computed for all business listings in a given LSA. At block 604, all national businesses listed in the LSA with their out-of-LSA address and geo-coordinates are excluded from consideration. That is, in some instances, a national business may have a physical location within the LSA but may be listed with the address for a business headquarters. For example, the means and standard deviations for the latitude and longitude, ($\mu_l$, $\sigma_l$) and ($\mu_g$, $\sigma_g$) respectively, are computed using all geo-coordinates (l,g) where: (l,g) is within a predetermined radius (e.g., in miles) of ($\mu_{lb}$, $\mu_{gb}$); l is within $\sigma_{lb}$ of $\mu_{lb}$; and g is within $\sigma_{gb}$ of $\mu_{gb}$.

At block 606, the business density for the most business-dense region in the LSA is computed. For example, a minimum and maximum longitude ($g_m$, $g_M$) and latitude ($l_m$, $l_M$) for all businesses that are within (+−½ $\sigma_g$) and (+−½ $\sigma_l$) of $\mu_g$ and $\mu_l$, respectively. Business density per square mile ($d_2$) in the region is equal to the number of businesses in the rectangle defined by the lower-left ($g_m$, $l_m$) and upper-right ($g_M$, $l_M$) corner. Business density per mile is $d_1 = \sqrt{d_2}$.

At block 608, the geo-location quantization accuracy is computed. For example, a desired number of business listings $N_q$ are selected that will fall to the same geo-coordinates when the quantization is applied. $N_q$ corresponds roughly to the minimum desired number of different businesses in two adjacent geo-centric language models. Quantization accuracy ($\delta_{qm}$), in miles, then follows from the business density per mile, $d_1 : \delta_{qm} = N_q / d_1$. Quantization accuracy for a particular longitude $\delta_g$ satisfies the equation:

$$\text{dist}((\mu_g, \mu_l), (\mu_g + \delta_g, \mu_l)) = \delta_{qm}. \quad (1)$$

$\delta_l$ satisfies a similar equation.

At block 610, the geo-coordinates for each business in the LSA are quantized. For example, the quantized geo-coordinates ($l_q$, $g_q$) for each business in the LSA are satisfied by the equations:

$$l_q = \text{int}(l/\delta_l) \times \delta_l \quad (2)$$

and $$g_q = \text{int}(g/\delta_g) \times \delta_g. \quad (3)$$

Each unique pair of quantized geo-coordinates is a language model center. The number of geo-centric language model centers can be arbitrarily small, depending on the parameter values. In experiments, the inventors determined that using, in some circumstances, any number of language models between about ten thousand and about one hundred thousand is generally sufficient to achieve good accuracy while maintaining tractability for language model building and selection. In particular, the inventors found that about fifteen thousand language models are sufficient to cover the entire United States, for example.

In sum, the method 600 describes an algorithm for building geo-centric language models for voice-driven business search that provides a local language model for any user anywhere in the country (e.g., United States) and that uses business density to determine local listings for any location in the country. In some embodiments, the algorithm is pre-compiled and/or tuned (by modifying the parameters) to maximize performance for a particular application.

Figure 7:
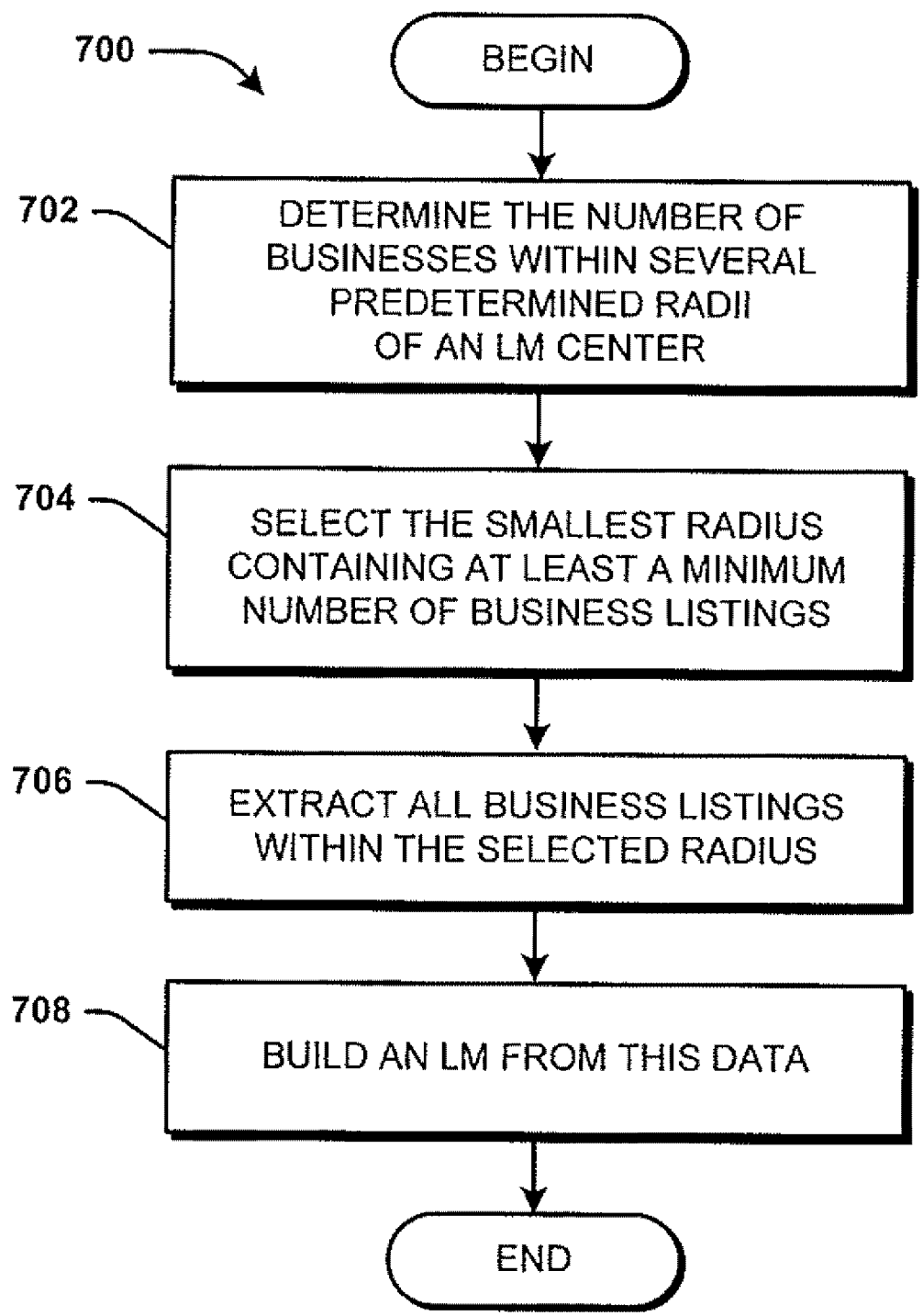
FIG. 7 illustrates an exemplary method for building a geo-centric language model, according to another embodiment of the present disclosure.

Referring now to FIG. 7, a method 700 is illustrated for creating geo-centric language models based upon the language model centers computed using the method 600. It should be understood that the steps of the method 700 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 700 can be ended at any time. In certain embodiments, some or all steps of this process, and/or substantially equivalent steps can be performed by execution of computer-readable instructions stored or included on a computer readable medium, such as the memory module 102 of the NVDSS 100 or the memory 206 of the mobile device 200, for example. In other embodiments, some or all steps of this process and/or substantially equivalent steps can be performed by the LMCE 112, the SRE 114, the LMSE 118 of the NVDSS 100 or functionally equivalent engines (not shown) of the mobile device 200 depending upon whether the method 700 is being implemented at the network- or device-level.

After the language model centers are computed as described above, a geo-centric language model for each center is be generated as follows. The method 700 begins and flow proceeds to block 702, wherein the number of businesses within several predetermined radii of a language model center is determined. For example, the number of business can be determined for businesses within a 1, 2, and 3-mile radius of the language model center. Although language models are often described as being circular in shape with varying radii, it should be understood that the language models built using the systems and methods of the present disclosure are not limited to certain shapes, such as, for example, a circle.

At block 704, the smallest radius containing at least a minimum number of business listings is selected. For example, the smallest radius containing at least one thousand listings. In some embodiments, the maximum predetermined radius is selected if there is no smaller radius containing at least one thousand listings.

At block 706, all business listings within the selected radius are extracted. At block 708, a language model is built from the extracted business listings. The method 700 can end.

It is contemplated that the radius increment, maximum radius, and maximum number of businesses per geo-centric language model can be varied for a particular application. In sum, according to the methods 600, 700 described above build geo-centric language models for voice-driven search that: 1) provide a local language model for any caller at any location; 2) uses business density to define local for any location in a given area (e.g., a country); 3) can be precompiled to reduce recognition time; and 4) can be tuned, for example, by modifying the value of $N_q$, by modifying the local search area radius and/or by modifying the maximum number of businesses in a geo-centric language model, to maximize performance for a particular application.

Figure 8:
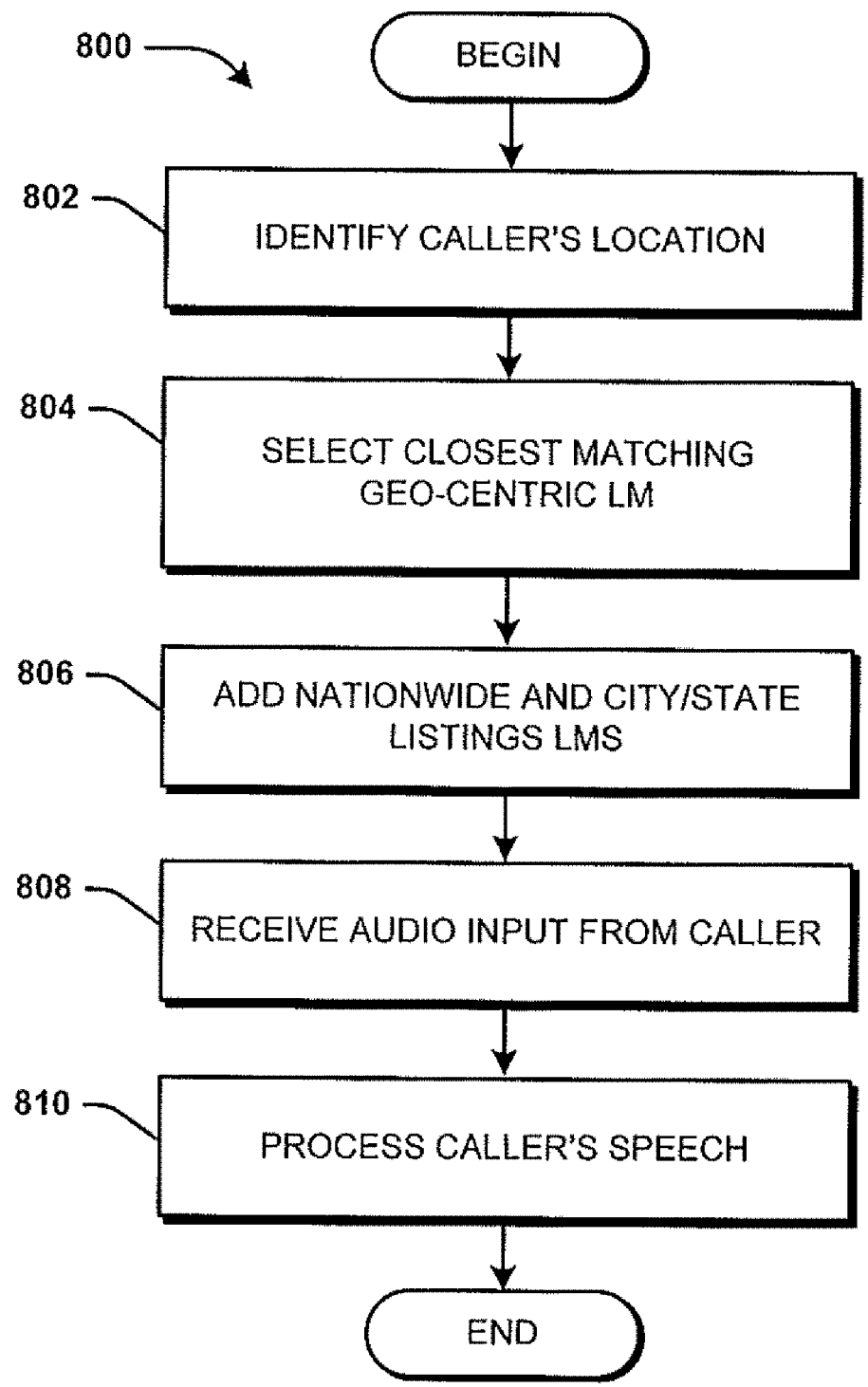
FIG. 8 illustrates an exemplary method for selecting a geo-centric language model at run-time, according to one embodiment of the present disclosure.

Referring now to FIG. 8, a method 800 for selecting a geo-centric language model at run-time is illustrated, according to one embodiment of the present disclosure. It should be understood that the steps of the method 800 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 800 can be ended at any time. In certain embodiments, some or all steps of this process, and/or substantially equivalent steps can be performed by execution of computer-readable instructions stored or included on a computer readable medium, such as the memory module 102 of the NVDSS 100 or the memory 206 of the mobile device 200, for example. In other embodiments, some or all steps of this process and/or substantially equivalent steps can be performed by the LMCE 112, the SRE 114, the LMSE 118 of the NVDSS 100 or functionally equivalent engines (not shown) of the mobile device 200 depending upon whether the method 800 is being implemented at the network- or device-level.

The method 800 begins and flow proceeds to block 802, wherein a caller's location is identified (e.g., via GPS, cellular triangulation, and/or WIFI triangulation techniques). At block 804, the closest matching geo-centric language model is selected. At block 806, nationwide and/or city/state language models are added to the geo-centric language model. At block 808, an audio input (speech signal) is received from the caller. At block 810, the audio input is processed in accordance with the combined language model.

In the above method, the caller provides an audio input using either a voice channel or a data channel. If the caller provides the audio input using the voice channel, the NVDSS 100, for example, approximates the caller's location using the caller's phone number. If the caller instead provides the audio input using the data channel, the location component 238 of the caller's mobile device 200 provides the location using GPS, cellular triangulation, and/or WIFI triangulation techniques. A language model selector 400 (the LMSE 118 or one of the applications 208) receives the location input and selects a geo-centric language model with a center latitude and a center longitude that are closest to the latitude and longitude provided in the location input. The language model selector 400 sends the selected geo-centric language model to a speech recognition engine 300 (the SRE 114 or one of the applications 208). The speech recognition engine 300 then processes the audio input in accordance with the selected geo-centric language model.

In some embodiments of the present disclosure, the selected geo-centric language model can be combined with one or more other language models to achieve improved speech recognition accuracy with minimal recognition time. In one embodiment, the SRE 300, at recognition time, combines the selected geo-centric language model with a nationwide language model containing the most frequent listings nationwide (e.g., restaurant chains). In another embodiment, the SRE 300, at recognition time, combines the selected geo-centric language model with a city-state language model. The present disclosure provides two exemplary methods for combining these language models, these methods are described immediately below.

In one embodiment, a count merging strategy is used by the SRE 300 to combine language models. The count merging strategy can be viewed as an instance of maximum a posteriori (MAP) adaptation. For example, let hw be an n-gram ending in word w and with a certain context h, and let $c_L(hw)$ and $C_T(hw)$ be its counts in the geo-centric/local area corpus L and top 2000 national corpus T, respectively Then p(w|h) is computed as:

$$p(w\mid h) = \frac{\lambda_L c_L(hw) + (1-\lambda_L)c_T(hw)}{\lambda_L c_L(h) + (1-\lambda_L)c_T(h)}, \qquad (4)$$

where $\lambda_L$ is a constant that controls the contribution of each corpus to the combined model.

In another embodiment, a language model union strategy is used by the SRE 300 at runtime. For example, let $W=w_o w_1 \ldots w_{|W|}$ be a sentence, $p_L(W)$ be the probability of W in the top 2000 national corpus T. Then p(W) is computed as:

$$p(W) = \max(\lambda_L p_L(W), (1-\lambda_L)p_T(W)) \qquad (5),$$

where $\lambda_L$ is a constant that controls the contribution of each corpus to the combined model.

The count merging strategy provides the best relative recognition accuracy with excellent relative recognition time, while the language model union strategy provides very good relative recognition accuracy with the best relative recognition time. In some embodiments, the SRE 300 employs a combination strategy whereby, the SRE 300 selectively uses the count merging strategy and the language model union strategy based upon the requirements of a given application. For example, the count merging strategy can be used for applications in which accuracy is a priority. Likewise, the language model union strategy can be used for applications in which recognition time is a priority.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method, for creating a geo-centric language model for use in performing a search for a user of a mobile communications device, comprising:
   determining a location of the mobile communications device;
   determining, at a language model creation engine, a geographic center for a local service area, to be used in the search, based on the location of the mobile communications device, yielding a determined local service area;
   computing, at the language model creation engine, a listing density, for the local service area, the listing density representing a density of searchable listings located in the determined local service area, yielding a computed listing density,
   determining, at the language model creation engine, based on the computed listing density, a radius for use in creating the geo-centric language model, yielding a determined radius; and
   determining, at the language model creation engine, the geo-centric language model to correspond to a region defined by the determined radius about the location of the mobile communications device.

2. The method of claim 1, wherein the steps are performed by a voice-driven search system, which includes the language model creation engine.

3. The method of claim 2, wherein the voice-driven search system is one of a network-based voice-driven search system and a device-based voice-driven search system.

4. The method of claim 2 wherein:
   the method further comprises receiving, at the voice-driven search system, said location;
   determining the qeo-centric language model, corresponding to the region defined by the determined radius about the location of the mobile communications device, includes selecting, at the voice-driven search system, one of a plurality of language models stored in a language model database that covers said region;
   the method further comprises receiving, at the voice-driven search system, an audio input provided by the user; and
   the method further comprises processing, at the voice-driven search system, the audio input based at least in part upon the determined language model to determine a search request identified in the audio input.

5. The method of claim 4, wherein receiving, at the voice-driven search system, the location comprises receiving the location as determined by the mobile communication device, the mobile device being in communication with the voice-driven search system, wherein the mobile device determines the location via at least one of cellular triangulation, WIFI triangulation, global positioning system (GPS), assisted GPS (A-GPS), area code, and user input.

6. The method of claim 4, wherein receiving, at the voice-driven search system, the location comprises receiving the location as determined by the mobile communication device, the mobile device comprising the voice-driven search system, wherein the mobile device determines the location via at least one of cellular triangulation, WIFI triangulation, GPS, assisted GPS (A-GPS), area code, and user input.

7. The method of claim further comprising the language model creation engine excluding, from consideration in determining the geo-centric language model, any listings that are listed in the region but have an address or geo-coordinates outside of the region.

8. A method for creating geo-centric language models, the method comprising:
   computing, at a language model creation engine, a mean and a standard deviation for latitude and longitude coordinates over all listings in a local service area;
   computing, at the language model creation engine, a listing density for a most listing-dense region in the local service area;
   computing, at the language model creation engine, a geo-location quantization accuracy for the local service area;
   quantizing, at the language model creation engine, a set of geo-coordinates for each listing in the local service area, each unique set of geo-coordinates defining a center of a language model;
   determining, at the language model creation engine, a number of listings within at least two predetermined radii of the language model center for one of the unique sets of geo-coordinates;
   selecting, at the language model creation engine, a radius from the at least two predetermined radii that contains at least a predetermined minimum number of listings;
   extracting, at the language model creation engine, all listings within the selected radius; and
   creating, at the language model creation engine, a language model comprising all listings within the selected radius.

9. The method of claim 8, wherein the language model creation engine is part of a voice-driven system and the method further comprises the voice-driving search system:
   receiving a location of a user;
   selecting one of a plurality of language models stored in a language model database that covers an area including the location of the user;
   receiving an audio input provided by the user; and
   processing the audio input based at least in part upon the selected language model to determine a search request identified in the audio input.

10. The method of claim 9, wherein the steps performed by the voice-driven search system are performed by a network-based voice-driven search system.

11. The method of claim 9, wherein the steps performed by the voice-driven search system are performed by a mobile device-based voice-driven search system.

12. The method of claim 8 further comprising the language model creation engine excluding, from the geo-centric listing set, any listings that are listed in the local service area with an address and geo-coordinates outside of the local service area.

13. A non-transitory computer-readable medium comprising computer-executable instructions, for creating a geo-centric language model for use in performing a search for a user of a mobile-communications device, wherein the instructions, when executed by a processor, cause the processor to perform steps comprising:

determining a location of the mobile communications device;

determining a geographic center for a local service area, to be used in the search, based on the location of the mobile communications device, yielding a determined local service area;

computing a listing density, for the local service area, the listing density representing a density of searchable listings located in the determined local service area, yielding a computed listing density; and determining the geo-centric language model to correspond to a region defined by the determined radius about the location of the mobile communications device.

14. The non-transitory computer-readable medium of claim 13, wherein the processor is part of a network-based voice-driven system and the steps of the method are performed by the processor for the network-based voice-driven system.

15. The non-transitory computer-readable medium of claim 13, wherein the processor is part of a mobile device-based voice-driven system and the steps of the method are performed by the processor for the device-based voice-driven system.

16. The non-transitory computer-readable medium of claim 13 further comprising computer-executable instructions that, when executed by the processor, cause the processor to perform the additional steps of:

receiving all the location;

determining the geo-centric language model, corresponding to the region defined by the determined radius about the location of the mobile communications device, including selecting one of a plurality of language models stored in a language model database that covers said region;

receiving an audio input provided by the user; and processing the audio input based at least in part upon the determined language model to determine a search request identified in the audio input.

17. The non-transitory computer-readable medium of claim 16, wherein the computer-executable instructions in causing the processor to receive the location, causes the processor to receive the location as determined by a mobile device via at least one of cellular triangulation, WIFI triangulation, global positioning system (GPS), assisted GPS (A-GPS), area code, and user input, wherein the mobile device is remote to the processor.

18. The non-transitory computer-readable medium of claim 16, wherein the computer-executable instructions in causing the processor to receive the location, causes the processor to receive the location as determined by a mobile device via at least one of cellular triangulation, WIFI triangulation, GPS, A-GPS, area code, and user input, wherein the mobile device includes the processor.

19. The non-transitory computer-readable medium of claim 16 further comprising computer-executable instructions that, when executed by the processor, cause the processor to perform an additional step of excluding, from consideration in determining the geo-centric language model listing set, any national listings that are listed in the region but have an address or geo-coordinates outside of the region.

20. The non-transitory computer-readable medium of claim 16 further comprising computer-executable instructions that, when executed by the processor, cause the processor to perform an additional step of combining the geo-centric language model and a national language model using a count merging combination strategy or a language model union combination strategy.

* * * * *